Patented Jan. 6, 1925.

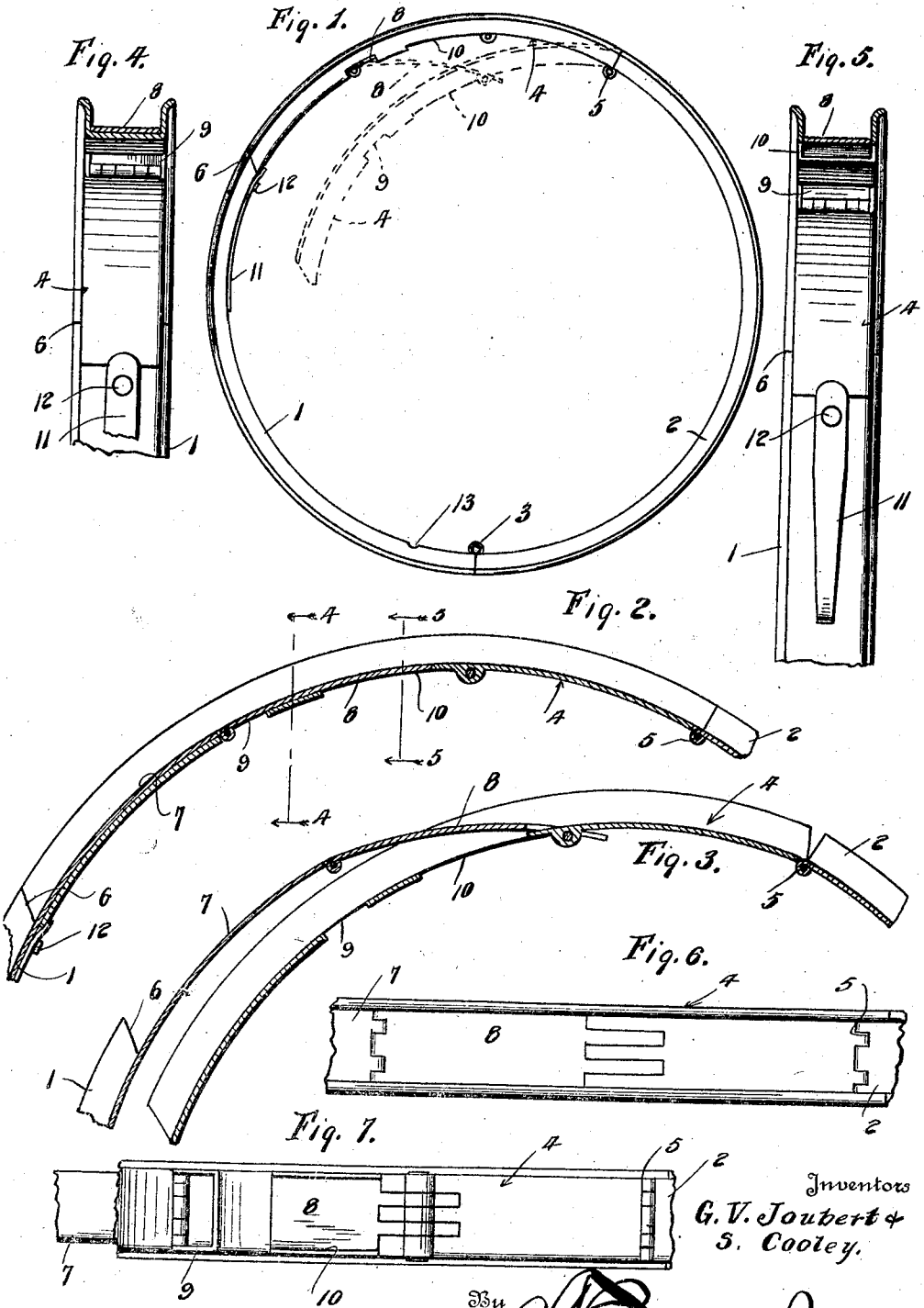

1,522,301

UNITED STATES PATENT OFFICE.

GUILLAUME V. JOUBERT AND SAMUEL COOLEY, OF SAVANNAH, GEORGIA.

DEMOUNTABLE RIM.

Application filed February 19, 1923. Serial No. 619,975.

*To all whom it may concern:*

Be it known that we, GUILLAUME V. JOUBERT and SAMUEL COOLEY, citizens of the United States, residing at Savannah, in the county of Chatham and State of Georgia, have invented certain new and useful Improvements in Demountable Rims; and we do hereby declare the following to be a full, clear, and exact description of the invention, such as will enable others skilled in the art to which it appertains to make and use the same.

The invention has relation to demountable rims and has for its primary object to facilitate the mounting and dismounting of a tire, the rim being of sectional formation and readily collapsible to facilitate the removing or the placing of the tire in position and capable of being easily expanded to provide a firm seat for the tire mounted thereon, locking means being provided to secure the rim when expanded.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a demountable rim embodying the invention, the full lines showing the rim expanded and the dotted lines the rim when collapsed to facilitate the removal or the placing of a tire in position, Figure 2 is a longitudinal section of a portion of the rim, when the same is expanded, Figure 3 is a sectional view of the parts illustrated in Figure 2 with the rim partly collapsed, Figure 4 is a cross section on the line 4—4 of Figure 2, looking to the left as indicated by the arrows, Figure 5 is a transverse section on the line 5—5 of Figure 2, Figure 6 is a plan view of a portion of the rim, as seen from the outer side, and Figure 7 is a view similar to Figure 6, as seen from the inner side.

Corresponding and like parts are referred to in the following description and designated in the several views of the drawings by like reference characters.

The demountable rim comprises two main sections 1 and 2 hingedly connected at 3 and a relatively short lever section 4 hinged to the main section 2 at 5. The sections 1 and 4 meet on an oblique joint 6 when the rim is expanded. The section 1 has an extension or tongue 7 which is adapted to overlie the swinging end of the lever section 4. A link 8 is pivotally connected at one end to the extremity of the tongue or extension 7 and is similarly connected at its opposite end to the lever section 4. The link 8 lies against the outer side of the lever section 4 when the rim is expanded, as shown most clearly in Figure 2. The several rim sections are of channel formation and the lever section 4 has portions cut from its bottom, as indicated at 9 and 10, to provide clearance for opposite end portions of the link 8, the latter serving to close the cutaway portions when the rim is expanded. The several parts may be hingedly connected in any preferred way, according to the special construction of the rim and as may be found most advantageous.

Locking means is provided for securing the rim when expanded and, as shown, a lever 11 is disposed against the inner side of the section 1 and is pivoted near one end thereto, as indicated at 12, the projecting end of the lever 11 being adapted to engage the end of the section 4 and hold the same in outward position when the rim is expanded, as indicated most clearly in Figure 1. The section 1 is provided with an opening 13 to receive the valve stem of the tire in a manner well understood.

To collapse the rim when it is required to dismount a tire or place one in position upon the rim, the lever 11 is swung laterally to release the section 4 which is moved inwardly at its free end, thereby collapsing the rim, as indicated by the dotted lines in Figure 1. After the tire has been mounted upon the rim, the latter is expanded by moving the free end of the section 4 outwardly, which operates through the link 8 to spread the ends of the sections 1 and 2, and when the section 4 reaches the limit of its outward movement, it is made secure by means of the lock device 11 in the manner stated.

What is claimed is:

1. A demountable rim comprising two main sections hingedly connected, one of said sections having a tongue extension at its free end, a lever section hinged at one end to the other main section, and a link connection between the lever section and the outer end of said tongue.

2. A demountable rim comprising two main sections hingedly connected, one of said sections having a tongue extension at its free end, a lever section hinged at one end to the other main section, and a link connection between the lever section and the outer end of said tongue, said lever section having portions of its bottom cut away opposite end portions of said link and closed thereby when the rim is expanded.

In testimony whereof we affix our signatures in presence of two witnesses.

GUILLAUME V. JOUBERT.
SAMUEL COOLEY.

Witnesses:
GEO. W. THOMAS,
T. BACHAUST.